United States Patent
Han et al.

(10) Patent No.: US 10,915,317 B2
(45) Date of Patent: Feb. 9, 2021

(54) MULTIPLE-PIPELINE ARCHITECTURE WITH SPECIAL NUMBER DETECTION

(71) Applicant: ALIBABA GROUP HOLDING LIMITED, Grand Cayman (KY)

(72) Inventors: Liang Han, San Mateo, CA (US); Xiaowei Jiang, San Mateo, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 66 days.

(21) Appl. No.: 16/215,553

(22) Filed: Dec. 10, 2018

(65) Prior Publication Data

US 2019/0196814 A1 Jun. 27, 2019

Related U.S. Application Data

(60) Provisional application No. 62/610,077, filed on Dec. 22, 2017.

(51) Int. Cl.
| | |
|---|---|
| *G06F 9/38* | (2018.01) |
| *G06F 9/30* | (2018.01) |
| *G06N 3/063* | (2006.01) |
| *G06N 3/08* | (2006.01) |
| *G06N 3/04* | (2006.01) |

(52) U.S. Cl.
CPC .......... *G06F 9/3001* (2013.01); *G06F 9/3867* (2013.01); *G06F 9/3887* (2013.01); *G06N 3/063* (2013.01); *G06N 3/04* (2013.01); *G06N 3/0481* (2013.01); *G06N 3/08* (2013.01)

(58) Field of Classification Search
None
See application file for complete search history.

(56) References Cited

U.S. PATENT DOCUMENTS

| | | |
|---|---|---|
| 2005/0251638 A1 | 11/2005 | Boutaud et al. |
| 2006/0004989 A1* | 1/2006 | Golla ............... G06F 9/3861 712/214 |
| 2007/0186036 A1 | 8/2007 | Bittner, Jr. |
| 2009/0019317 A1* | 1/2009 | Quach ............... G06F 11/3466 714/47.1 |
| 2011/0188580 A1 | 8/2011 | Valmiki et al. |
| 2012/0131309 A1 | 5/2012 | Johnson et al. |
| 2014/0337581 A1* | 11/2014 | Meier ............... G06F 12/0862 711/123 |
| 2015/0339103 A1* | 11/2015 | Olsen ............... G06F 7/483 708/491 |
| 2016/0335203 A1* | 11/2016 | Sauer ............... G06F 13/4022 |
| 2017/0351318 A1* | 12/2017 | Gu ............... G06F 9/30083 |

OTHER PUBLICATIONS

PCT International Search Report dated Apr. 2, 2019, issued in corresponding International Application No. PCT/US2018/067352 (14 pgs.).

* cited by examiner

*Primary Examiner* — Hyun Nam
(74) *Attorney, Agent, or Firm* — Finnegan, Henderson, Farabow, Garrett & Dunner, LLP

(57) ABSTRACT

The present disclosure relates to a computing device with a multiple pipeline architecture. The multiple pipeline architecture comprises a first and second pipeline for which are concurrently running, where the first pipeline runs at least one cycle ahead of the second pipeline. Special number detection is utilized on the first pipeline, where a special number is a numerical value which yields a predictable result. Upon the detection of a special number, a computation is optimized.

21 Claims, 9 Drawing Sheets

MULTIPLE-PIPELINE ARCHITECTURE WITH SPECIAL NUMBER DETECTION

CROSS REFERENCE TO RELATED APPLICATION

The disclosure claims the benefits of priority to U.S. Provisional Application No. 62/610,077, filed Dec. 22, 2017, which is incorporated herein by reference in its entirety.

BACKGROUND

Developing neural network processors to accelerate neural-network-based deep-learning applications has gained significant traction across many business segments, including established chip makers, start-up companies as well as large Internet companies. Single Instruction Multiple Data (SIMD) architecture can be applied to chips to accelerate operations for applications of deep learning. With the exponential growth of neural network based deep learning applications such as image recognition, speech/voice recognition, and machine translation, it is desirable to maintain and increase a system's computational strength.

SUMMARY

The present disclosure relates to methods and systems for a multiple-pipe pipeline with special number detection ability to simplify operations and increase computational strength.

Consistent with some disclosed embodiments, a method for computation, with special number detection, in a computational device with a multiple-pipeline architecture is provided. The computational device comprises memory for storing instructions and a processing unit for executing the instructions to perform the method. The method comprises concurrently running a first and second pipeline of data from the memory. The first pipeline is configured to receive a first operand from the memory and the second pipeline is configured to receive a second operand from the memory. The first pipeline operates at least one cycle ahead of the second pipeline.

The method further includes generating a memory address in the memory for the first operand and reading, on the first pipeline, the first operand from the generated memory address. The method additionally includes detecting, by a detector, if the first operand is a special number, where a special number is a numerical value which yields a predetermined or predictable operation result.

If the first operand is a special number, the method further includes retrieving a result associated with the detected special number and storing the retrieved result in the memory for the first and second pipeline. If the first operand is not a special number, the method further includes generating a memory address in the memory for the second operand, reading, on the second pipeline, the second operand from the generated memory address, performing an operation on the first and second operand, and storing a result of the performed operation in the memory for the first and second pipeline.

Some embodiments disclosed herein are directed towards a computational device for computation with special number detection. The computational device comprises a memory and a first and second pipeline. The first pipeline is configured to receive a first operand from the memory and the second pipeline is configured to receive a second operand from the memory. The first pipeline operates at least one cycle ahead of the second pipeline. The device further comprises a processing unit to generate a memory address in the memory for the first operand.

The first pipeline reads the first operand from the generated memory address. Thereafter, a detector detects if the first operand is a special number. A special number is a numerical value which yields a predetermined or predictable operation result.

If the first operand is a special number, the processing unit retrieves the predetermined or predictable operation result associated with the detected special number and stores the retrieved result in the memory for the first and second pipeline.

If the first operand is not a special number, the processing unit generates a memory address in the memory for the second operand. The second pipeline thereafter reads the second operand from the generated memory address. The processing unit then performs an operation on the first and second operand and stores a result of the performed operation in the memory for the first and second pipeline.

Consistent with some disclosed embodiments, a method for a multiple-pipe pipeline with special number detection ability in computing devices, each comprising one or more memories storing instructions and one or more processors executing the instructions to perform the method is disclosed. The method comprising concurrently running a pair of pipelines of data from the one or more memories, wherein one pipeline in the pair takes a broadcasting operand and the other pipeline in the pair takes a private operand, generating a memory address in the one or more memories for the broadcasting operand, reading the broadcasting operand from the generated memory address, detecting, by a detector, if the broadcasting operand is a zero, stopping the generation of a memory address in the one or more memories for the private operand if the broadcasting operand is a zero and updating the memory address in the one or more memories for the private operand if the broadcasting operand is a one, detecting, by another detector, if the broadcasting operand is a one, computing a result of the broadcasting operand and the private operand, and storing the result to a memory address in the one or more memories for the pair of pipelines of data.

Consistent with some disclosed embodiments, a system for a multiple-pipe pipeline with special number detection ability to simplify operations and increase computational strength is provided.

Consistent with some disclosed embodiments, a computer-readable storage medium comprises a set of instructions executable by at least one processor to perform the aforementioned method is provided.

Consistent with other disclosed embodiments, a non-transitory computer readable storage media may store program instructions, which are executed by at least one processing device and perform the aforementioned method described herein.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In computing devices, for example desktops, laptops, servers, cellular devices such as cellular phones, PDAs, tablets, and the like, comprising central processing units (CPUs), graphics processing units (GPUs), digital signal processing units (DSPs), Neural Network processors, etc., computational strength is usually defined as the device's ability to perform operations quickly. The computational strength may be increased by the device's ability to detect special numbers, such as 0, 1, etc. For computer architectures with vector, SIMD, or array compute, such detection and ability to perform operations based on the detection may increase the computational strength even further.

The disclosed embodiments relate to methods and systems for a multiple-pipe pipeline with special number detection ability to simplify operations and increase computational strength. It should be appreciated the term 'multiple' herein shall be interpreted to mean two or more. Special numbers are numbers that yield a predetermined or predictable result when used in operations. Results which are predetermined or predictable are operation results that are obtainable without preforming the operation. An example of such a number may be the number 1 or zero in a multiplication operation. Specifically, multiplying a first number with the number one will always yield a result being equal to the first number, while multiplying any number with the number zero will always yield a result of zero. Thus, due to the ability of detecting such numbers, as described herein, the performance of such operations may be optimized as the result is determinable based on the detection of the special number. Therefore, being able to recognize such numbers may increase computational strength as calculating times will be reduced since a result may be determined without performing a full operation if a special number is detected.

Figure 1:
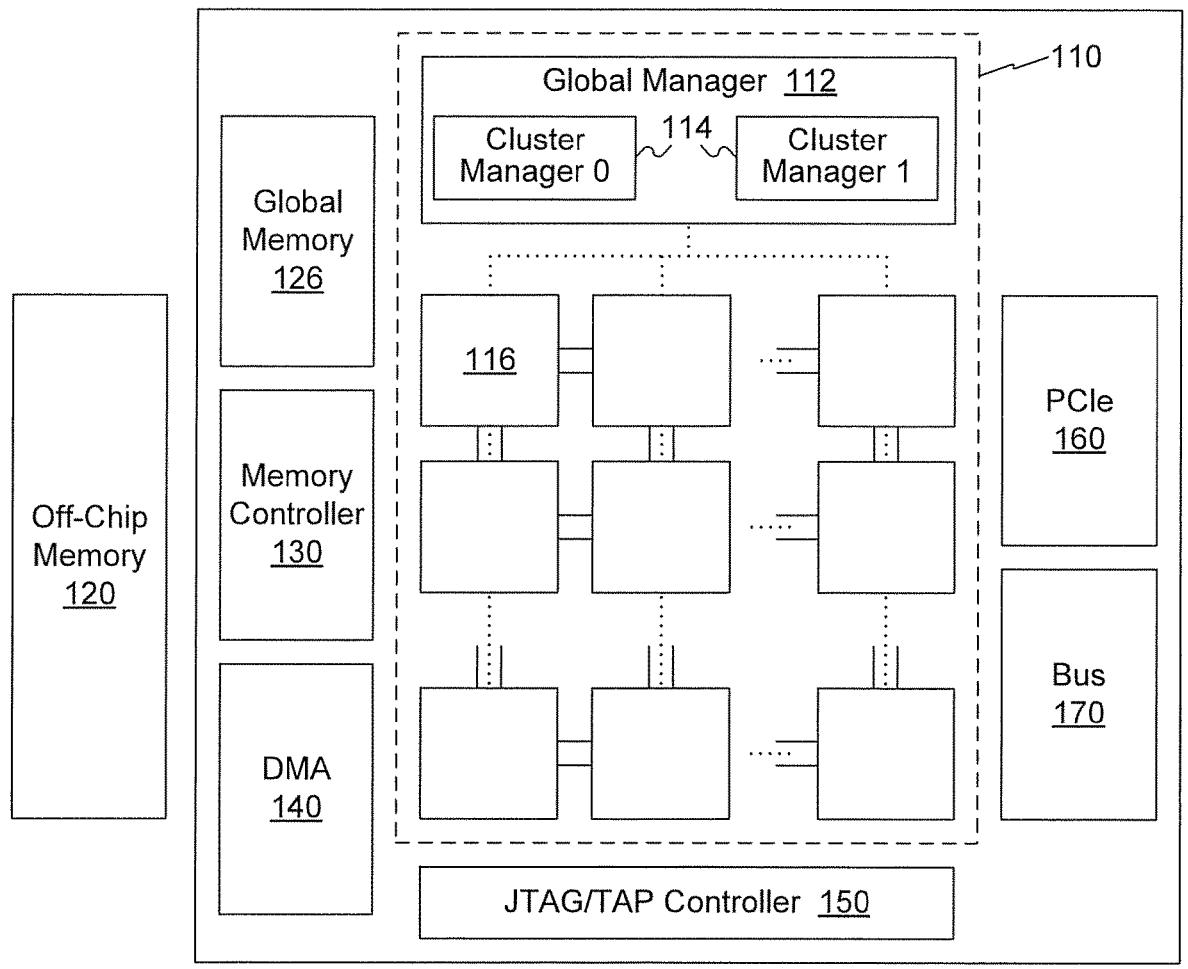
FIG. 1 illustrates an exemplary neural network processing unit (NPU) architecture, consistent with embodiments of the present disclosure.

Example embodiments disclosed herein will be explained with the use of neural networks. However, it should be appreciated the example embodiments may be applied to any other system in which computations may be optimized. FIG. 1 illustrates an exemplary neural network processing unit (NPU) architecture 100. NPU architecture 100 can include an on-chip communication system 110, a host memory 120, a memory controller 130, a direct memory access (DMA) unit 140, a Joint Test Action Group (JTAG)/Test Access End (TAP) controller 150, a peripheral component interconnect express (PCIe) interface 160, bus 170, a global memory 126, and the like. It is appreciated that on-chip communication system 110 can perform algorithmic operations based on communicated data. Moreover, NPU architecture 500 can include a global memory 126 having on-chip memory blocks (e.g., 4 blocks of 8 GB second generation of high bandwidth memory (HBM2)) to serve as main memory.

On-chip communication system 110 can include a global manager 112 and a plurality of cores 116. Global manager 112 can include one or more task managers 114 configured to coordinate with one or more cores 116. Each task manager 114 can be associated with an array of cores 116 that provide synapse/neuron circuitry for the neural network. For example, the top layer of cores of FIG. 1 may provide circuitry representing an input layer to neural network, while the second layer of cores may provide circuitry representing one or more hidden layers of the neural network. As shown in FIG. 1, global manager 112 can include two task managers 114 configured to coordinate with two arrays of cores 116.

Cores 116 can include one or more processing elements that each include single instruction, multiple data (SIMD) architecture including one or more processing units configured to perform one or more operations (e.g., multiplication, addition, multiply-accumulate, etc.) on the communicated data under the control of global manager 112. To perform the operation on the communicated data packets, cores 116 can include at least one buffer for storing the data packets, one or more buffers for storing instructions, one or more memories for storing information in the data packets, and one or more processing elements for processing the information in the data packets. Each processing element may comprise any number of processing units. In some embodiments, core 116 can be considered a tile or the like.

Host memory 120 can be off-chip memory such as a host CPU's memory. For example, host memory 120 can be a DDR memory (e.g., DDR SDRAM) or the like. Host memory 120 can be configured to store a large amount of data with slower access speed, compared to the on-chip memory integrated within one or more processor, acting as a higher-level cache.

Memory controller 130 can manage the reading and writing of data to and from a memory block (e.g., HBM2) within global memory 126. For example, memory controller 130 can manage read/write data coming from outside chip communication system 110 (e.g., from DMA unit 140 or a DMA unit corresponding with another NPU) or from inside chip communication system 110 (e.g., from a local memory in core 116 via a 2D mesh controlled by a task manager of global manager 112). Moreover, while one memory controller is shown in FIG. 1, it is appreciated that more than one memory controller can be provided in NPU architecture 100. For example, there can be one memory controller for each memory block (e.g., HBM2) within global memory 126.

Memory controller 130 can generate memory addresses and initiate memory read or write cycles. Memory controller 130 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (110) device or writing to the I/O device), the size of the transfer unit, the number of bytes to transfer in one burst, and/or other typical features of memory controllers.

DMA unit 140 can assist with transferring data between host memory 120 and global memory 126. In additional, DMA unit 140 can assist with transferring data between multiple NPUs. DMA unit 140 can allow off-chip devices to access both on-chip and off-chip memory without causing a CPU interrupt. Thus, DMA unit 140 can also generate memory addresses and initiate memory read or write cycles. DMA unit 140 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, and/or the number of bytes to transfer in one burst. It is appreciated that NPU architecture 100 can include a second DMA unit, which can be used to transfer data between other NPU architectures to allow multiple NPU architectures to communication directly without involving the host CPU.

JTAG/TAP controller 150 can specify a dedicated debug port implementing a serial communications interface (e.g., a JTAG interface) for low-overhead access to the NPU without requiring direct external access to the system address and data buses. The JTAG/TAP controller 150 can also have an on-chip test access interface (e.g., a TAP interface) that implements a protocol to access a set of test registers that present chip logic levels and device capabilities of various parts.

Peripheral interface 160 (such as a PCIe interface), if present, serves as an (and typically the) inter-chip bus, providing communication between the NPU and other devices.

Bus 170 includes both intra-chip bus and inter-chip buses. The intra-chip bus connects all internal components to one another as called for by the system architecture. While not all components are connected to every other component, all components do have some connection to other components they need to communicate with. The inter-chip bus connects the NPU with other devices, such as the off-chip memory or peripherals. Typically, if there is a PCIe interface, that is the inter-chip bus and bus 170 is solely concerned with intra-chip buses, though in some implementations is could still be concerned with specialized inter-bus communications.

While NPU architecture 100 incorporates the embodiments of the present disclosure, it is appreciated that the disclosed embodiments can be applied to chips with SIMD architecture for accelerating some applications such as deep learning. Such chips can be, for example, GPU, CPU with vector processing ability, or neural network accelerators for deep learning. SIMD or vector architecture is commonly used to support computing devices with data parallelism, such as graphics processing and deep learning. The SIMD architecture can involve multiple processing elements, wherein each of the processing elements can perform the same operation on multiple data points simultaneously.

In some embodiments, neural network processors comprise a compiler (not shown). The compiler is a program or computer software that transforms computer code written in one programming language into NPU instructions to create an executable program. In machining applications, a compiler can perform a variety of operations, for example, pre-processing, lexical analysis, parsing, semantic analysis, conversion of input programs to an intermediate representation, code optimization, and code generation, or combinations thereof.

In some embodiments, the compiler can be on a host unit (e.g., CPU having host memory 104), which pushes commands to NPU 100. Based on these commands, task manager 1022 can assign any number of tasks to one or more cores (e.g., core 1024). Some of the commands can instruct DMA unit 108 to load instructions and data from host memory 104 into global memory 116. The loaded instructions can then be distributed to each core assigned with the corresponding task, and the one or more cores can process these instructions.

It is appreciated that the first few instructions received by the core can instruct the core to load/store data from global memory 116 into one or more local memories of the core (e.g., a memory of the core or a local memory for each active processing element of the core). Each core can then initiate the instruction pipeline, which involves fetching the instruction (e.g., via a fetch unit) from the local memory, decoding the instruction (e.g., via an instruction decoder) and generating local memory addresses (e.g., corresponding to an operand), reading the source data, executing or loading/storing operations, and then writing back results.

Figure 2A:
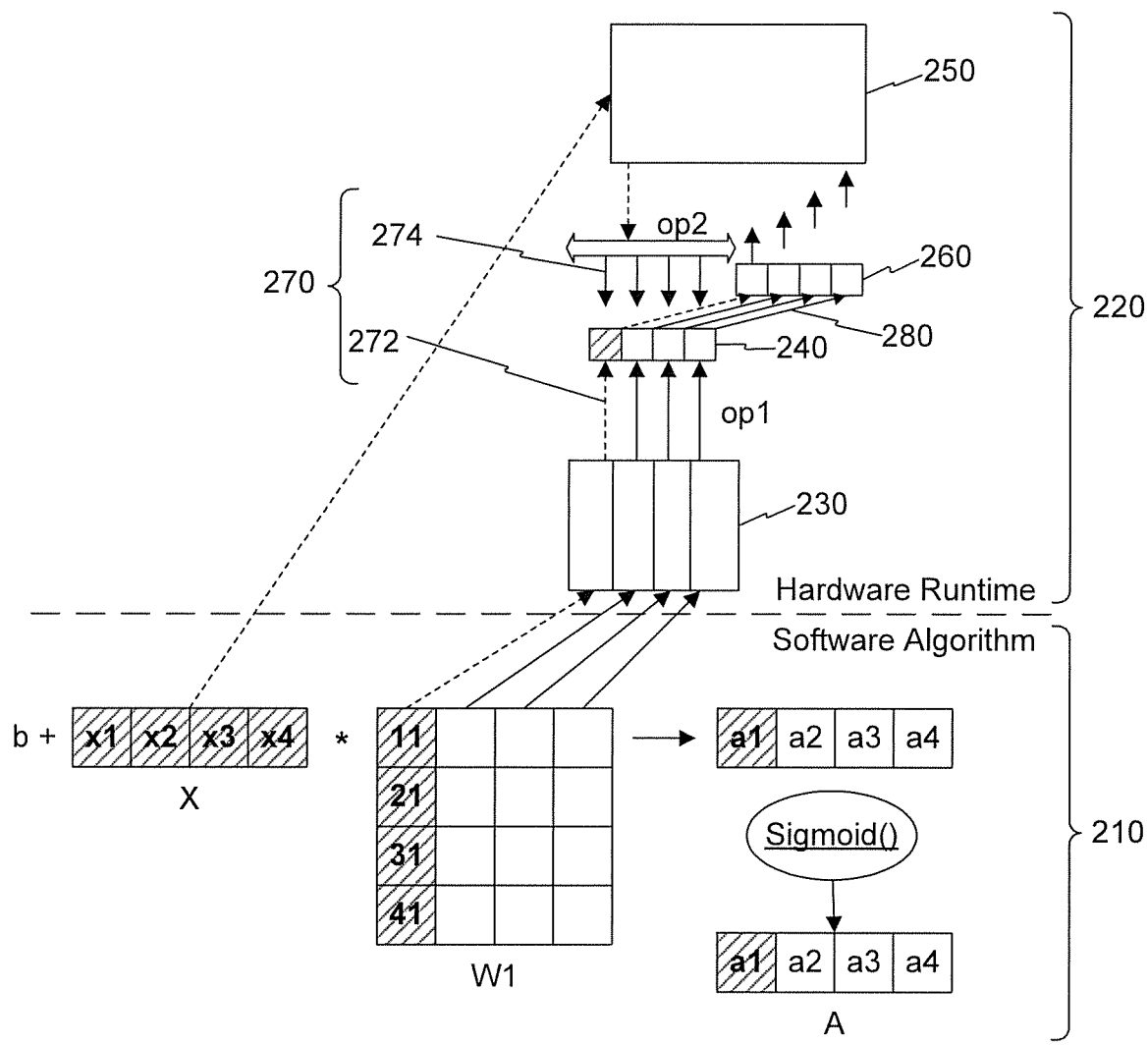
FIG. 2A illustrates an exemplary functionality of a layer of neural network processor, consistent with embodiments of the present disclosure.

FIG. 2A illustrates an exemplary functionality of a layer 200 of a neural network, including a software algorithm 210 and hardware 220. Hardware 220 can include a private memory module 230, one or more processing units of processing unit array 240, a shared (e.g., broadcast) memory module 250, a write buffer 260, input operands 270, output operand 280, and the like. In some embodiments, hardware 220 can be located in a core (e.g. core 116 of FIG. 1). It should be appreciated that a single and homogenous memory module may also be employed.

In some embodiments, a processing unit of processing unit array 240 can provide one or more operations, such as multiplication, addition, multiply-accumulate, etc. Processing unit array 240 can include multiple processing units 242, 244, 246, and 248, for example, an array of processing units, as illustrated in FIG. 2B.

Figure 2B:
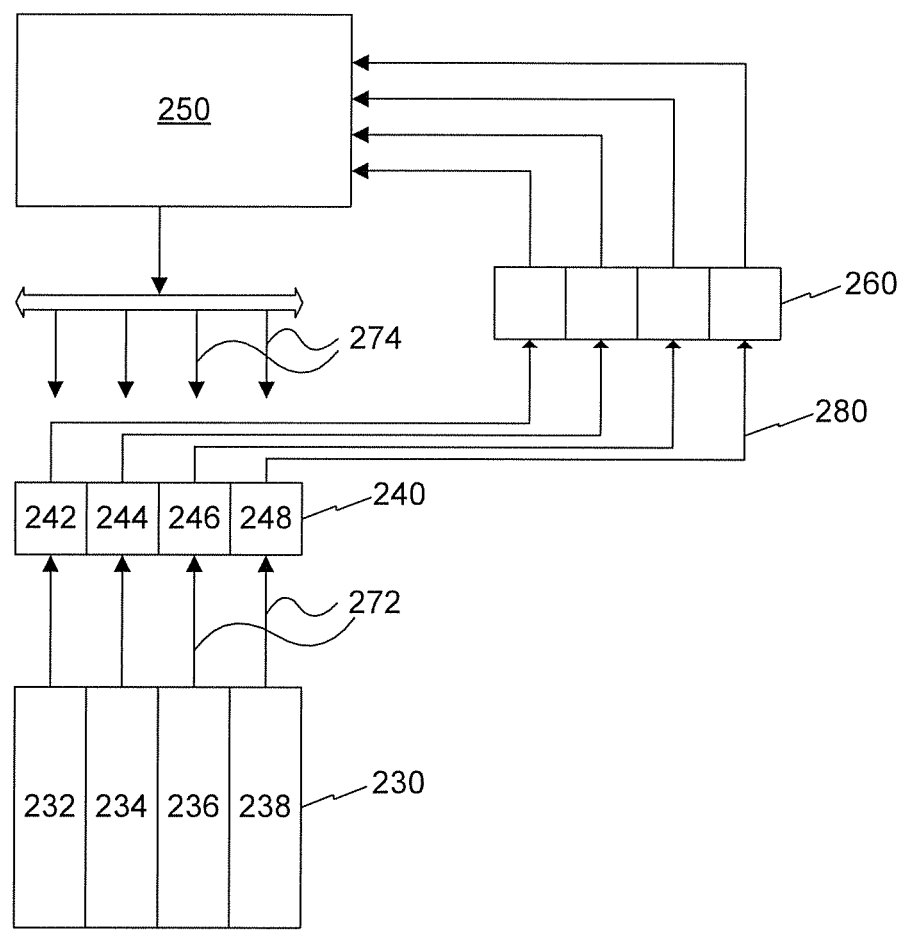
FIG. 2B illustrates an exemplary hardware neural network processor, consistent with embodiments of the present disclosure.

Private memory module 230 can be partitioned into separate private memory blocks, such that, each of the multiple processing units 242, 244, 246, and 248 has a corresponding private memory block 232, 234, 236, and 238, as shown in FIG. 2B.

Input operands 270 can be the input data operated on by processing unit array 240. In some embodiments, input operands 270 of FIG. 2A can include one or more private input operand(s) 272 and one or more shared input operand(s) 274, as shown in FIG. 2B. Private input operand 272 can be stored in private memory module 230 and shared input operand 274 can be stored in shared memory module 250.

In the application of neural networks, software algorithms 210 have shared data that can be stored in shared memory module 250 and can be broadcasted to each of the multiple processing units 242, 244, 246, and 248 of processing unit array 240 as a shared operand 274. For example, the algorithm illustrated in FIG. 2A is computing a vector operation of:

$$A = \text{sigmoid}(b + X * W1) \quad \text{(Eq. 1)}$$

which is a representative operation in layer 200 of a neural network called out often in deep learning algorithms. With reference to equation 1, "b" can include a constant value, "X" can include a shared input operand 274, and "W1" can include a private input operand 272.

With reference to FIG. 2A, the vector size can be set as any natural number. Here, a vector size of 4 is taken as an example, and a 4-way SIMD hardware to compute the vector is used. The processing units 242, 244, 246, and 248 can compute, in parallel, the following operations:

$$a1 = \text{sigmoid}(b + x1*W1_{11} + x2*W1_{21} + x3*W1_{31} + x4*W1_{41}) \quad \text{(Eq. 2)}$$

$$a2 = \text{sigmoid}(b + x1*W1_{12} + x2*W1_{22} + x3*W1_{32} + x4*W1_{42}) \quad \text{(Eq. 3)}$$

$$a3 = \text{sigmoid}(b + x1*W1_{13} + x2*W1_{23} + x3*W1_{33} + x4*W1_{43}) \quad \text{(Eq. 4)}$$

$$a4 = \text{sigmoid}(b + x1*W1_{14} + x2*W1_{24} + x3*W1_{34} + x4*W1_{44}) \quad \text{(Eq. 5)}$$

The shaded blocks and dotted lines in FIG. 2A indicate how "a1" is calculated. From this operation, it is appreciated that data in each column of the "W1" array is local to a corresponding processing unit of processing unit array 240 and the data can accordingly be stored in corresponding memory block of private memory module 230, as a private input operand 272. For example, the data in each of the first, second, third, and fourth columns of the W1 array can be stored in their corresponding memory blocks 232, 234, 236, and 238 of private memory module 230 as private input operands.

With reference to FIG. 2A, the W1 array can include a matrix of stored data, wherein each element of the matrix is represented as W1ij or W1_ij (as shown later), where "i" represents the row number and "j" represents the column number in the matrix. For example, in Eq. 2, $W1_{41}$ represents the data stored in the element located at row 4 and column 1 of the W1 array. Other commonly known notations to address elements in a matrix can be used as well.

Simultaneously, data in the X-array is utilized by all processing units 242, 244, 246, and 248, and is accordingly stored in shared memory module 250, as shared input operand 274 and broadcasted to all components reading from shared memory module 250. Equations 2-5 represent exemplary operations performed in layer 200 of a neural network processor, designed to calculate a1, a2, a3 and a4.

In some embodiments, machine learning or deep learning includes training the neural network processor to generate an end result based on input data, accomplished by implementing algorithms for one or more layers of neural processing. For example, layer 200 of FIG. 2A, represents a first layer including an algorithm configured to perform an operation using a bias b, data stored in the X array, and data stored in W1 array. A second and third layer (not shown) can include algorithms using the bias b, data stored in the X array, and data stored in W2 and W3 array. Each layer can include a different value of bias b and different parameters stored in "W" array.

With reference to FIG. 2A, for example, array X can include an individual's scores in different classes. The value of x1 of the array X can be student A's Math score, x2 can be the English score, x3 can be the History score, and x4 can be the Science score. The end result can be whether the individual will be granted admission in a school or rejected, based on the scores (input data). As shown in FIG. 2A, and described in Equations 2-5, data x1-x4 is "shared" and common in calculating a1-a4.

Figure 3:
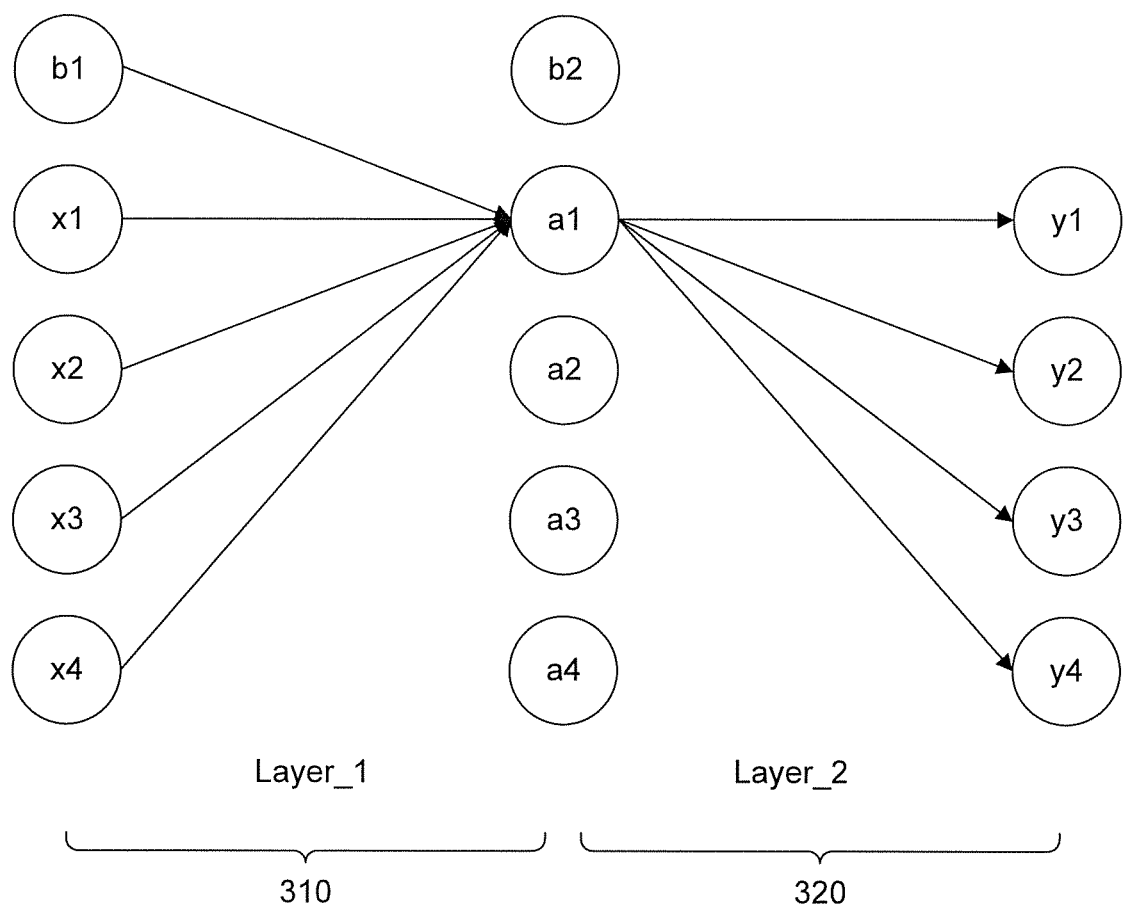
FIG. 3 illustrates data sharing in multi-layer networks, consistent with embodiments of the present disclosure.

FIG. 3 illustrates data sharing in multi-layer networks. Data sharing, as described herein, refers to how previously private data can become shared data in a later phase of a program. In some embodiments, neural network architecture 300 includes multiple layers, for example, layers 310 and 320. In some embodiments, output operand 280 of layer 310 can be used as an input operand 270 for layer 320. In some embodiments, the output operand 280 of one layer can be utilized as input operand 270 by one or more layers.

For example, in layer 310, a1 is calculated by processing unit 242 of private memory module 230. The data in a1 becomes a broadcasting input for layer 320. Generally, a neural network can be organized in layers. Each layer can perform one or more operations on its inputs and generate an output. The output of a layer can be passed onto a next layer for further processing. For example, an output of a previous layer can be an input for the next layer. Accordingly, the locally generated "a"s have to be either stored back to shared memory 250, or stored to private memory 230 and copied later to shared memory 250.

As an alternative solution to storing in private memory 230 and copying to shared memory 250 later, output operand 280 from a1 can be stored back directly to shared memory 250 than memory copying. Nevertheless, this alternative solution could still slow down the program. Since a single processing unit, for example processing unit 242, can finish only one multiply-add operation per cycle, say Xi*W1_ij, each operation of "a" can be performed over multiple cycles. For this reason, only one operand of W1_ij is read out from private memory 230 in each cycle, thus only one "X" is needed from shared memory 250. Consequently, a common design of each memory module is single-read/single-write per cycle. When all "a"s are generated simultaneously by multiple processing units in the last cycle, shared memory 250 may not have the ability to write them all back.

In some embodiments, a write buffer 260 is introduced to allow shared memory 250 more time to consume these output operands 280 individually. However, when the output speed of processing unit 240 is faster than the width of write buffer 260, e.g., the size of A is greater than X, write buffer 260 may propagate a back pressure, forcing the processing unit array 240 to slow down, resulting in the slowdown of the overall program execution.

Figure 4A:
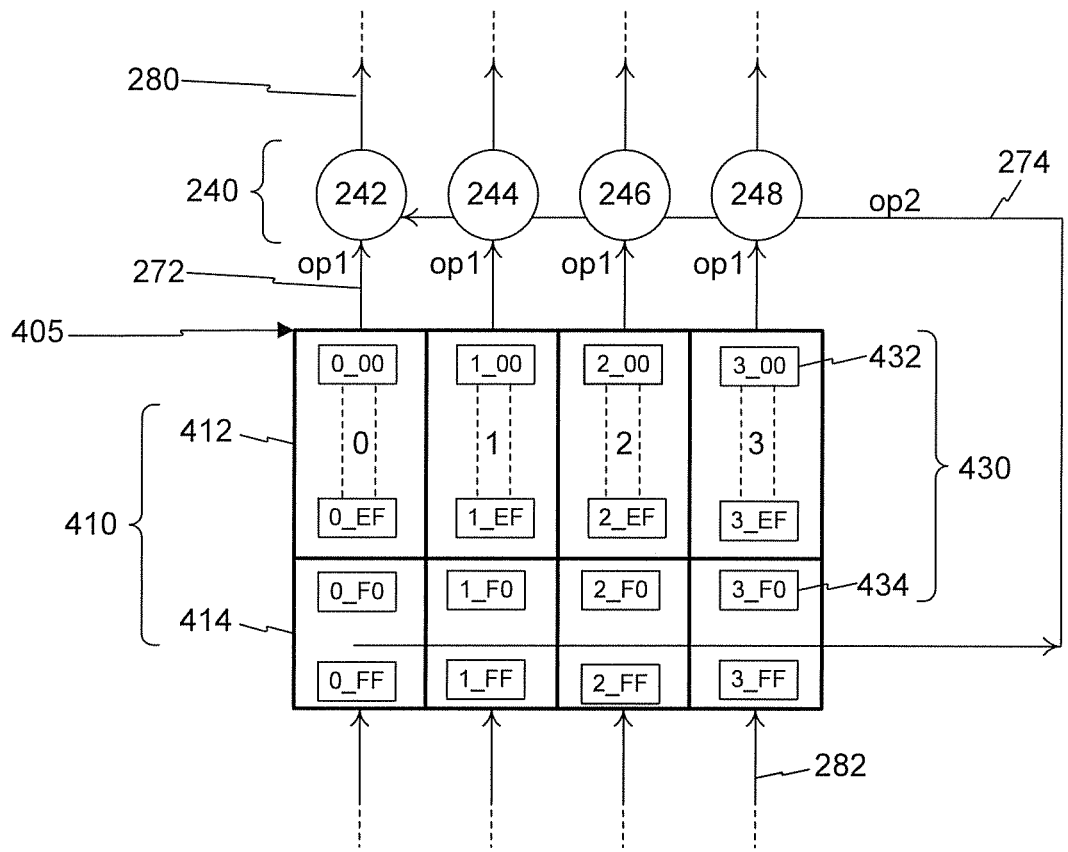
FIG. 4A illustrates a schematic diagram of an exemplary hardware including unified organization of memory modules, consistent with embodiments of the present disclosure.

FIG. 4A illustrates a schematic diagram of an exemplary hardware system 400 including unified organization of memory modules. Hardware system 400 includes a unified storage medium 405 and processing units 242, 244, 246, and 248. Unified storage medium 405 includes one or more storage modules 410, each including storage cells 430 configured to store input operand 270, output data 280. Multiple storage modules 410 can be merged into a single medium to form unified storage medium 405. Each storage module 410 can include a private storage module 412 and a shared storage module 414. It should be appreciated in some example embodiments, the memory module may be a single and homogenous medium.

Hardware system 400 can include multiple processing units 242, 244, 246, and 248. Each of the multiple processing units of the processing unit array 240 is configured to communicate with one or more storage modules. For example, processing unit 242 can receive private input operand 272 from private storage module 412. Processing unit 242 can also receive shared input operand 274 from one or more shared storage modules 414. In some embodiments, processing unit array 240 is configured to receive private input operand 272 from private storage module 412, receive shared input operand 274 from shared storage module 414, and generate an output operand 280 based on private input operand 272 and shared input operand 274.

Figure 4B:
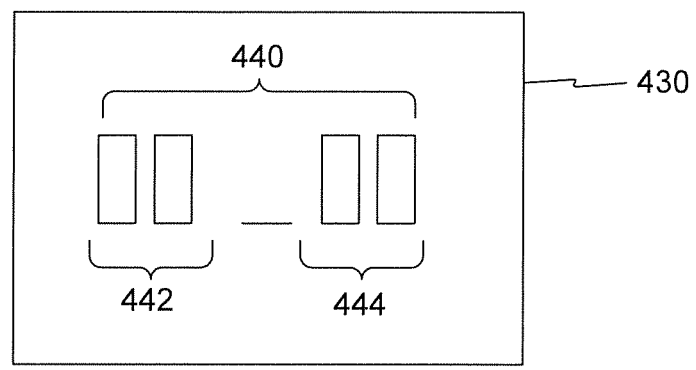
FIG. 4B illustrates an exemplary storage cell of a unified storage medium, consistent with embodiments of the present disclosure.

As illustrated in FIG. 4B, each of the storage cells 430 can be uniquely identified by a unique identifier 440. Unique identifier 440 can be a bit address including high-order bits 442 and low-order bits 444, or a byte address including high-order and low-order bytes, or a combination thereof. In computing, high-order bits 442 can be the most significant bit (MSB). The MSB can also be referred to as the left-most bit due to the convention in positional notation of writing more significant digits further to the left. Low-order bits 444, on the other hand, are referred to as bits in the right-most position. For example, in a unique identifier 440 having a bit address "2_E5", the high-order bits 442 refer to the left-most bit, i.e. "2" and the low-order bits 444 refer to the bits on the right side, i.e. "E5".

According to some of the example embodiments, memory, on or off chip, may be characterized as private or shared (e.g., broadcast) memory. For example, the private memory can be memory dedicated to serving data for each single processing element among multiple parallel processing elements, while shared memory can refer to memory dedicated to serving data for all parallel processing elements (e.g., all processing elements of a core). According to some of the example embodiments, the memory may be a single memory unit.

In some embodiments, storage cell 430 is a private storage cell 432 or a shared storage cell 434. Private storage cells 432 can be located within private storage module 412. Shared storage cells 434 can be located within shared storage module 414. High-order bits 442 of unique identifier 440 are configured to indicate a target storage module for operand (270, 280) and low-order bits 444 of unique identifier 440 are configured to indicate a target storage cell within target storage module, for operand (270, 280). For example, unique identifier 440 having a bit address "2_E5" refers to storage module "2", and storage cell "E5" within storage module "2". In other words, high-order bits 442 can also indicate the processing unit to which the storage module is "private" to, and low-order bits 444 indicate the location within the storage module.

It is to be appreciated that private storage cells 432 and shared storage cells 434 are physically indistinguishable storage cells and are not pre-labelled as such. The attribute of "private" and "shared" for a storage cell is determined based on the compiler-generated instructions programmed to address the data. For example, data can be stored in any cell. During a read step, if the compiler-generated instructions refer to the data as "private," the data may be read out in parallel as private input operand 272. Alternatively, if the compiler-generated instructions refer to the data as "shared," the data may be read out as shared input operand 274.

In some embodiments, unique identifier 440 includes other characters, for example, numeric characters, alphanumeric characters, hexadecimal numerals (e.g., shown in FIG. 4A), octal numerals, or the like, addressable by a software addressing mode.

Referring back to FIG. 4A, processing unit array 240 or each of the multiple processing units can generate output data 280. Output data 280 can be a private output data 282 or a shared output data 284, determined by the operations in the next layer of a multi-layered algorithm for a neural network processor. As illustrated in FIG. 4A, output data 280 can be considered private output data 282 since it is written back to unified storage medium parallel in each of the storage modules 410.

In the exemplary implementation of FIG. 4A, one operand of the processing unit array comes from private data, while the other comes from a number being broadcasted to all processing units (e.g., from shared memory). It should be appreciated that if the single opt, or shared operand 274, is detected as being a special number, the operation of the whole array may be simplified.

According to some of the example embodiments, the processing unit unit 240 comprises at least one detector for detecting the presence of a special number. Computational strength may be defined by a device's ability to perform operations quickly.

In mathematics, special numbers may be defined as numerical values that yield an expected result in operations. By taking advantage of special numbers such as 0, 1, etc., operations based on these special numbers may be simplified. For example: Any_Number*0=0; The_Number*1=The_Number; The_Number+0=The_Number; min(Range_Min, Any_Number)=Range_Min; max(Range_Max, Any_Number)=Range_Max; etc. When faced with special numbers, hardware in computing devices may perform some simplified operations instead of conventional ones. For example, result=0; do nothing; result=the other operand; etc. Thus, being able to identify special numbers may be useful in simplifying operations resulting in increased operation speed and therefore increased computational strength.

Figure 5:
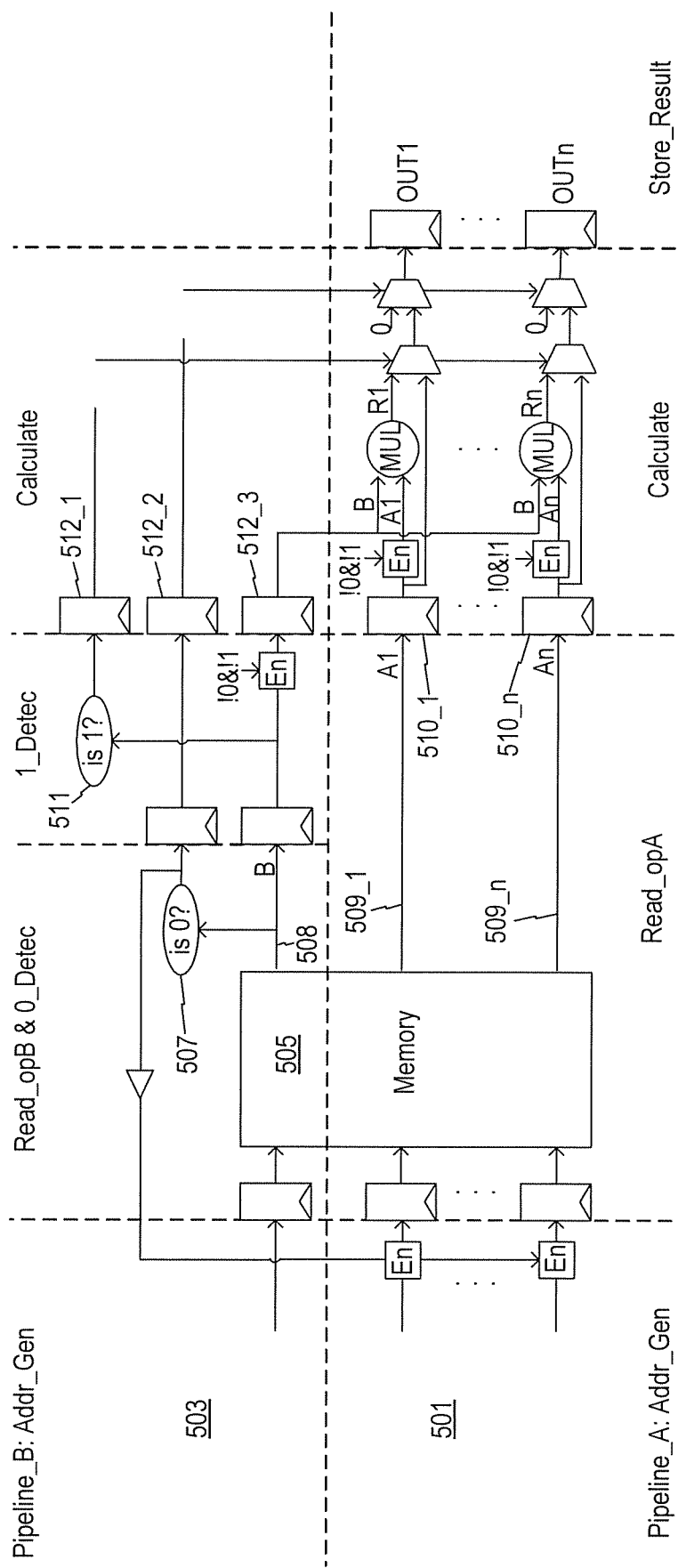
FIG. 5 illustrates a multiple pipeline configuration implemented in a computing device, consistent with embodiments of the present disclosure.

FIG. 5 illustrates a block diagram of an exemplary multiple-pipe pipeline architecture, consistent with embodiments of the present disclosure. The architecture of FIG. 5 illustrates one-portion of the multiple pipeline as Pipeline_A 501 and the portion-half as Pipeline_B 503, both of which are part of a core. For sake of simplicity, the architecture is explained in terms of a multiplication operation where: Result=opA*opB. It should be noted that the operations illustrated in FIG. 5 is not limited to multiplication with 2 operands but can be expanded to any operation, with any number of operands, that may be simplified for special numbers. For example, the multiple pipeline configuration may be utilized in addition-, subtraction-, multiplication-, and division-based operations (which can include multiply-accumulate operations, among others). In such operations, the number 0 may be identified as a special number.

Memory unit 505 may comprise shared 250 and private 230 memory as discussed in relation to FIG. 2A. One operand to be broadcasted, or read from shared memory, while the other operand may be private and read from private memory. It should be appreciated that the example embodiments presented herein may also be applied to a memory unit featuring homogenous storage cells.

Each of the operands have different pipeline stages, and since there are 2 pipelines, viz., Pipeline_A and Pipeline_B, running concurrently, the architecture is termed a multiple-pipe pipeline. Moreover, while it is appreciated that the pipeline can receive more than two operands, for purposes of simplicity the rest of the application focuses more on the multiple-pipe pipeline receiving two operands.

Since a single operation needs at least two operands at a same moment, a detection for the special number is performed via a detector 507 before the operation starts. It should be appreciated the detector 507 may be located within a core (e.g., core 116 of FIG. 1) and could be within any other processing unit or processor within the system.

According to some embodiments, the special number is detected via detector 507 even before the other operand (or any other operand) is read out of memory. To achieve this, a multiple-pipe pipeline is implemented, where one pipe is used for operand 1 and the other is used for operand 2. In the example provided by FIG. 5, the first operand, opB is read out of memory 505 using pipeline 508. Pipeline 509_1-509_n is used to read the second operand, opA, out of memory 505. The pipeline used for operand 1 operates at least one cycle ahead of the pipeline used for operand 2 to allow for the detection of the special number before operand 2 is read out of memory.

In operation, according to the present example, the first portion of the pipeline 503 has 4 stages for execution. These stages stage-1 through stage-4.

In stage-1, first, an instruction is fetched via, for example, an instruction fetch unit (not shown in FIG. 5). According to some of the example embodiments, the instruction is related to the computation to be performed. Thereafter, the received instructions may be decoded via, for example, an instruction decoder (not shown in FIG. 5). According to some of the example embodiments, the instruction decoder may comprise an address generator for generating a memory address based on the fetched and decoded instruction from the core for a first operand, opB.

In stage-2, data is read out of memory 505. According to some of the example embodiments, data is read out of memory using a pipeline 508 that is used for reading the first operand, opB out of memory 505. According to some of the example embodiments, the first operand, opB, may be read out of shared or broadcast memory. According to some of the example embodiments, the first operand may be read out from a single and homogenous memory unit.

A detector 507, which may be comprised in the core or in the processing unit array, determines the presence of a special number in the first operand, opB. In the present multiplication example, a first detection may be made for the number 0. If the detector finds a special number in the data in the form of a 0; The core will stop the generation of an address for the second operand (e.g., this step of the operation is prevented or skipped), opA, from being updated into the flip-flop 510_1-510_n between stages, so that opA is not read.

In stage-3, according to the present multiplication example where the processing unit operates as a multiplier, a detection may be made to determine if another special number is comprised in the data, for example, in the form of a 1. The second detection may be made by the same or a different detector located in the core or in the processing unit array. In the example illustrated in FIG. 5, a second detector 511 is utilized.

The results of the first and second detections are pushed into a next stage via the flip-flop 512_1 and 512_2. The results are predetermined or predictable based on the associated special number that is detected. If no special numbers, i.e., in the present example 0 or 1 are not detected, the data itself (opB) will be updated into the flip-flop 512_3.

In stage-4, according to the present multiplier (MUL) example works conditionally as:
Result=0, if opB is 0; or
Result=opA, if opB is 1; or
Result=Result, i.e., opA*opB.

In operation, and according to the present multiplication example, operations associated with the second operand, opA, which are performed by the second portion of the multiple pipeline 501, have 4 stages for execution.

Some of these stages may be similar to those associated with the first operand, opB, while some may be different. For example, in stage-1, a memory address to read the second operand, opA, is generated based on the fetched and decoded instruction from core. In the present example, if the first operand, opB, is not detected as being the special number 0, the data will be updated into the flip-flop 512-1 or 512-3 for next stage.

In stage-2, the data associated with the second operand, opA, is read out of memory 505, via the second pipeline 509_1-509_n.

In stage-3, a conditional operation is performed via the processing unit, as explained above in relation to stage-4 of the first operand, opB.

While in stage-4, the core stores the results back to memory for each data lane 509_1-509_n.

Figure 6:
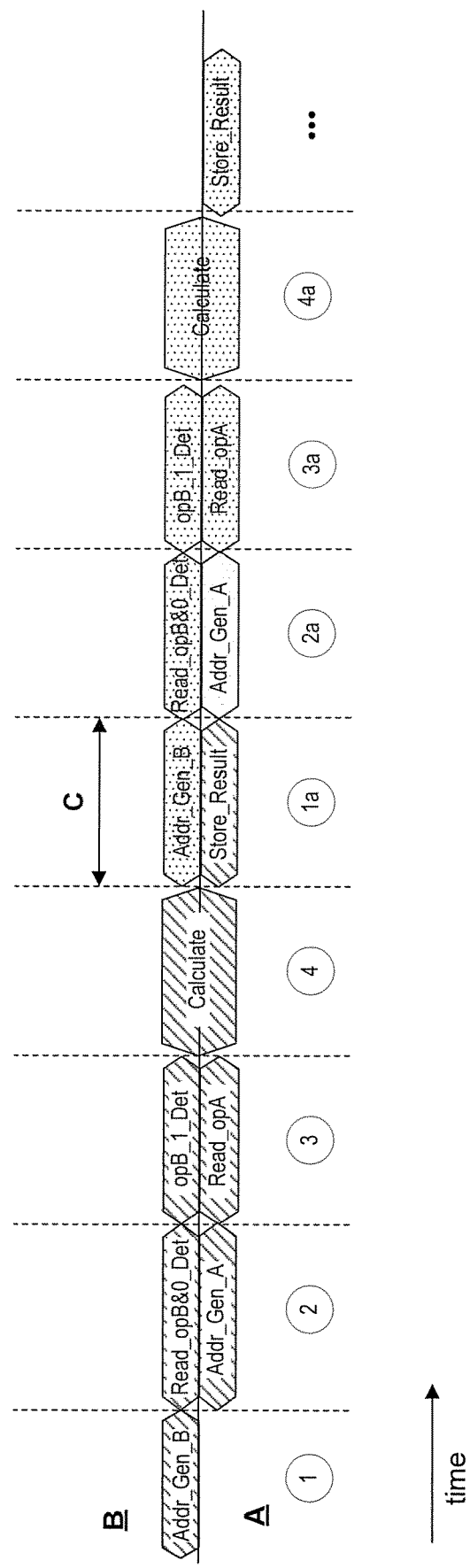
FIG. 6 is an operation cycle diagram of the multiple pipeline configuration of FIG. 5, consistent with embodiments of the present disclosure.

FIG. 6 illustrates the operations described in FIG. 5, consistent with embodiments of the present disclosure. In FIG. 6, vertical dashed lines represent the different operational cycles C of the multiple pipeline configuration of FIG. 5, where the cycle number of FIG. 6 corresponds to the stage numbers described in relation to FIG. 5. The upper portion B of FIG. 6 represents operations taken by the portion 503 of the pipeline architecture configured to operate on the first operand, opB. The lower portion A of FIG. 6 represents operations taken by the portion 501 of the pipeline architecture configured to operate on the second operand, opA. The hashed parts and the dotted parts show two different multiplication back to back. Each operation goes through the 4-stage Multiple-Pipe pipeline in turn as described in relation to FIG. 5.

As shown in FIG. 6, the portion 503 of the pipeline architecture configured to operate on operand opB starts one cycle before the portion 502 configured to operate on the second operand, opA. Because portion 503 starts one cycle before the portion 502, unnecessary operations may be prevented within portion 501 of the multiple pipeline configuration. For example, in stage 2/cycle 2, the first operand, opB, is read from memory and special number detection is performed. In the present multiplication example, a first detection is performed for the number 0. Upon detection that the first operand, opB, comprises the number 0, the generation of an address in memory to obtain the first operand, opA, is halted. Thus, any subsequent operations that would have taken place may also be halted (e.g., stages and cycles 3 and 4) and the predetermined or predictable result associated with the identified special number (0) may be stored and a new operation may start (cycles 1a-4a).

Figure 7:
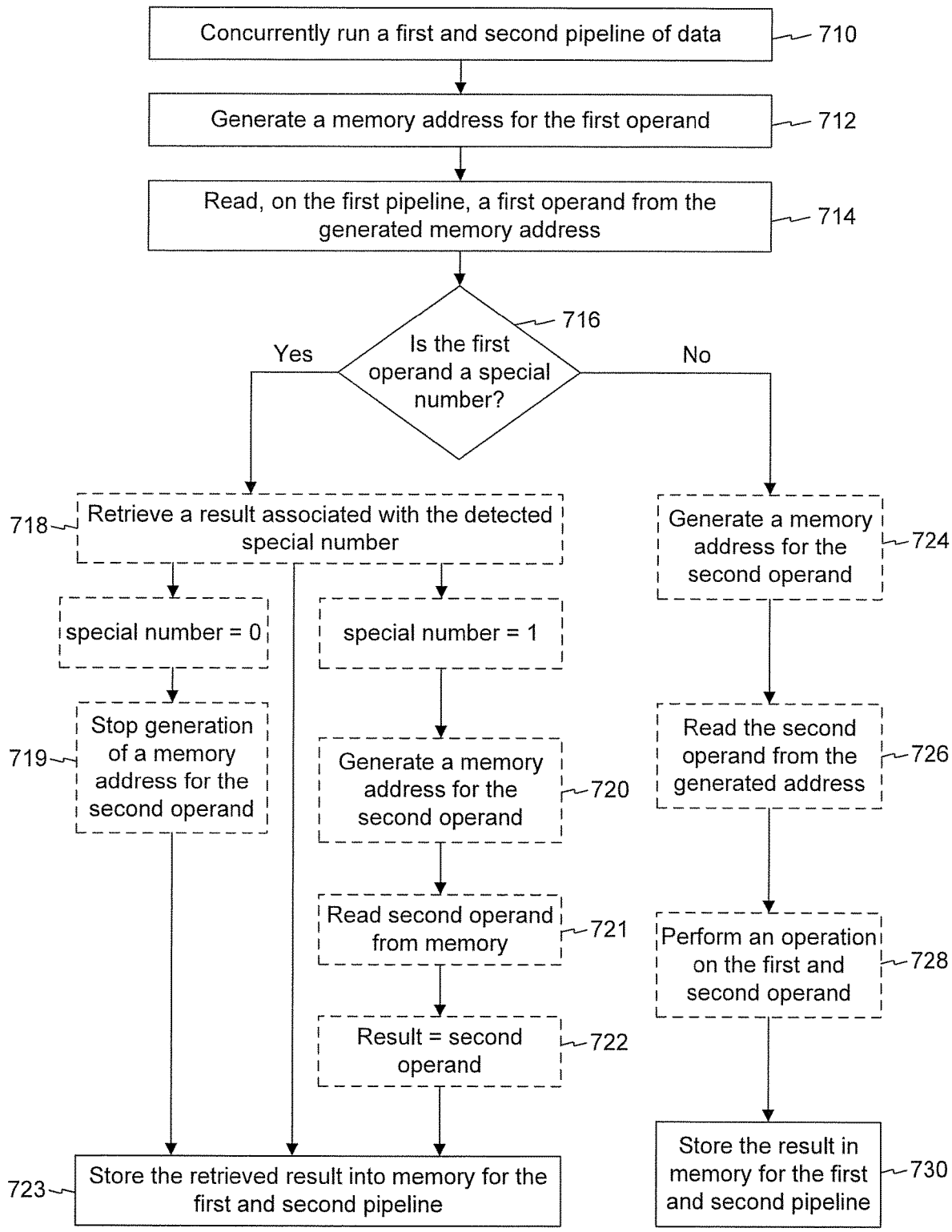
FIG. 7 is a process flow diagram of example operations taken by the computing device featuring the multiple pipeline configuration of FIG. 5, consistent with embodiments of the present disclosure.

FIG. 7 is a flow diagram depicting example operations which may be taken by the multiple pipeline configuration of FIG. 5 in providing computation, with special number detection, in a computational device with a multiple pipeline architecture. The computational device comprises memory storing instructions and one or more cores executing the instructions.

It should be appreciated that FIG. 7 comprises some operations that are illustrated with a solid border and some operations which are illustrated with a dashed border. The operations which are comprised in a solid border are operations that are comprised in the broadest example embodiment. The operations that are comprised in the dashed border are example embodiments that may be comprised in, or a part of, or are further operations that may be taken in addition to the operations of the border example embodiments. It should be appreciated that these operations need not be performed in order. Furthermore, it should be appreciated that not all of the operations need to be performed. The example operations may be performed in any order and in any combination.

The operations comprising concurrently running 710 a first and second pipeline of data from memory. The first pipeline is configured to receive a first operand from the memory and the second pipeline is configured to receive a second operand from the memory, where the first operand operates at least one cycle ahead of the second pipeline. A core may be configured to provide the concurrent running of the first and second pipeline.

As illustrated in FIGS. 5 and 6, special number detection is performed on at least one operand. For the operand in which such detection is performed, a separate pipeline is used to read the operand out of memory. This separate pipeline operates at least one cycle ahead of any other pipelines in the system. An example advantage of such an arrangement is being able to detect the presence of a special number prior to any other operations taking place in the system. A special number yields a predetermined or predictable result in an operation. Thus, upon detection of the presence of a special number, a result of the operation may be obtained without the need of performing the full operation. An example of such operation optimization is shown in FIG. 6, where the detection of a special number (0) provides a result without performing the remaining operations of cycles 3 and 4.

Thereafter, the operations comprise fetching an instruction form an instruction buffer via a fetch unit. The instructions may be related to the computation to be performed.

The operations further comprise decoding the fetched instructions. The decoding may be performed by a decoder or the core. Thereafter, the operations may further comprise generating 712 a memory address in the memory for the first operand. The core or an address generator may generate the memory address in the memory for the first operand. According to some of the example embodiments, the address may be generated based on the fetched and decoded instructions.

In FIG. 6, this operation is illustrated in cycle 1. In FIG. 5, this operation is described in elation to the first pipeline 503 with respect to stage 1. It should be appreciated, in some embodiments the memory may be a common memory storage.

In some embodiments, the memory may comprise a plurality of storage cells further comprising at least one shared memory storage cell and at least one private memory cell. According to some example embodiments, the first operand may be a broadcast operand stored in the shared memory storage cell and configured to be broadcast to the first pipeline. According to such example embodiments, the second operand may be a private operand stored in private memory storage cell and read to the second pipeline.

The operations may further comprise reading 714, on the first pipeline, the first operand from the generated memory address. The processing unit may be configured to read, to the first pipeline, the first operand from the generated memory address.

In FIG. 6, this operation is illustrated in cycle 2, as performed by the first pipeline B. In FIG. 5, this operation is described in relation to the first pipeline 503 with respect to stage 2.

The operations further comprise detecting 716, via a detector, if the first operand is a special number, where a special number is a numerical value that yields a predetermined or predictable operation result. The detector may be comprised in the core.

In FIG. 6, this operation is illustrated in cycle 2, as performed by the first pipeline B. In FIG. 5, this operation is described in relation to the first pipeline 503 with respect to stage 2.

If the first operand is detected as being a special number, the operations further comprise retrieving 718 a result associated with the detected special number. The processing unit may be configured to retrieve the result associated with the detected special number.

As the special number yields a predetermined or predictable result in an operation, this result may be obtained without performing the operation. Thus, these predetermined or predictable results may be stored in memory and retrieved upon the detection of the special number. Examples of such special numbers and corresponding predetermined or predictable results are (1) any number multiplied by the number 0 will yield a predetermined or predictable result of 0; and (2) any number multiplied by the number 1 will yield a predictable result of the number multiplied by 1.

According to some of the example embodiments, the operation to be performed by the multiple pipeline configuration is multiplication. According to such an embodiment, the detecting operation 716 may be configured to detect a special number in the form of a 0. According to such example embodiments, the operations may further comprise preventing 719 a generation of a memory address for the second operand. The core may be configured to stop the generation of the second operand.

According to such an example embodiment, as multiplication with the number 0 will yield a result of 0, there is no need to perform further operations. Thus, upon the detection, the operations of cycles 2-4 may be halted and the predetermined or predictable result of 0 may be stored.

According to some of the example embodiments, the operation to be performed by the multiple pipeline configuration is multiplication. According to such an embodiment, the detecting operation 716 may be configured to detect a special number in the form of a 1. According to such example embodiments, the operations may further comprise generating 720 a memory address for the second operand. The core may be configured to generate the memory address for the second operand. The generation of the memory address for the second operand may be based on the fetched and decoded instructions.

According to such an example embodiment, as multiplication with the number 1 will yield a result of the number being multiplied by 1, the operations of which may be optimized. Thus, upon the detection, the operation of cycle 4 may be halted and the predetermined or predictable result of the value of the second operand may be stored.

Upon generating 720 the memory address, operations may further comprise reading 721, on the second pipeline, the second operand form the generated memory address. The processing unit may be configured to read, on the second pipeline, the second operand from the generated memory address.

As discussed in relation to example operation 720, the predetermined or predictable result for a detected special number of 1 in a multiplication operation is the number being multiplied by 1. Thus, in determining the result, the second operand is read from memory.

The generating 720 and reading 721 further comprise assigning 722 a value of the result as being equal to a value of the second operand. The processing unit may be configured to assign the value of the result as being equal to the value of the second operand.

The operation of retrieving 718 further comprises storing 723 the retrieved result in the memory for the first and second pipeline. The core be configured to store the retrieved result in the memory for the first and the second pipeline.

If it is determined that the second operation is not a special number, the operations further comprise generating 724 a memory address in the memory for the second operand. The core may be configured to generate the memory address in the memory for the second operand.

Upon the detection that a special number does not exist, all stages as described in relation to FIG. 5 and all cycles as described in relation to FIG. 6 will be performed.

Upon generating 724 the address, operations further comprise reading 726, on the second pipeline, the second operand from the generated memory address. The processing unit may be configured to read, on the second pipeline, the second operand from the generated memory address.

In FIG. 6, this operation is illustrated in cycle 3, as performed by the second pipeline A. In FIG. 5, this operation is described in relation to the second pipeline 501 with respect to stage 2.

Upon reading 724 the second operand, operations further comprise performing 728 an operation on the first and second operand. The processing unit may be configured to perform the operation on the first and second operand.

In FIG. 6, this operation is illustrated in cycle 4. In FIG. 5, this operation is described in relation to the first pipeline 503 with respect to stage 3. It should be appreciated the fetch is stalled during cycles 1-3. In cycle 4, operations may further comprise the fetch unit retrieving a second instruction while the first instruction is being calculated. Cycles 1a-4a may be repeated using the second instruction.

Upon performing 728 the operation, operations further comprise storing 730 a result of the performed operation in the memory for the first and second pipeline. The core may be configured to store the result of the performed operation in the memory for the first and the second operand.

In FIG. 6, this operation is illustrated in cycle 1a, as performed by the first pipeline B. In FIG. 5, this operation is described in relation to the first pipeline 503 with respect to stage 4.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removeable and nonremovable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method for computation, with special number detection, in a computational device having a core with a multiple-pipeline architecture, the method comprising:
running, in parallel, a first and second pipeline of data from a memory, wherein the first pipeline is configured to receive a first operand from the memory and the second pipeline is configured to receive a second operand from the memory, and wherein the first operand and the second operand are input operands for performing a computational operation and the first pipeline operates at least one cycle ahead of the second pipeline;
generating a memory address in the memory for the first operand;
reading, on the first pipeline, the first operand from the generated memory address; and
detecting if the first operand is a special number, wherein a special number is a numerical value that yields a predictable operation result of the computational operation; and
storing a result of the computational operation in the memory based on the detection of whether the first operand is the special number.

2. The method of claim 1, wherein upon determining the first operand is a special number, the method further comprises:
retrieving the result corresponding to the predictable operation result of the computational operation that is yielded by the detected special number; and
storing the retrieved result in the memory for the first and second pipeline.

3. The method of claim 2, wherein the computational operation is a multiplication operation and wherein the first operand is detected as being a special number comprising a numerical value of zero, the method further comprising:
preventing a generation of a memory address for the second operand.

4. The method of claim 2, wherein the computational operation is a multiplication operation and wherein the first operand is detected as being a special number comprising a numerical value of one, the method further comprising:
generating a memory address for the second operand;
reading, on the second pipeline, the second operand from the generated memory address; and
assigning a value of the result as being equal to a value of the second operand.

5. The method of claim 1, wherein upon determining the first operand is not a special number, the method further comprises:
- generating a memory address in the memory for the second operand;
- reading, on the second pipeline, the second operand from the generated memory address;
- performing the computational operation on the first and second operand; and
- storing the result of the performed computational operation in the memory for the first and second pipeline.

6. A computational device for performing a computational operation with special number detection, the computational device comprising:
- a core having a plurality of processing units configured to perform operations, the core comprising:
  - a memory configured to store operands;
  - a first pipeline configured to read a first operand from the memory based on a memory address being generated for the first operand;
  - a second pipeline configured to receive a second operand from the memory, wherein the first operand and the second operand are input operands for performing the computational operation and the first pipeline operates at least one cycle ahead of the second pipeline;
  - a detector configured to detect if the first operand is a special number, wherein the special number is a numerical value that yields a predictable operation result of the computational operation, and
  - wherein the core is further configured to store a result in the memory based on the detection whether the first operand is a special number.

7. The computation device of claim 6, wherein if the first operand is a special number:
- the core is further configured to retrieve the predictable operation result of the computational operation that is yielded by the detected special number; and
- the core is also configured to store the retrieved result in the memory for the first and second pipeline.

8. The computational device of claim 7, wherein the computational operation is a multiplication operation and wherein the first operand is detected as being a special number comprising a numerical value of zero:
- the core is further configured to stop a generation of a memory address for the second operand.

9. The computational device of claim 7, wherein the computational operation is a multiplication operation and wherein the first operand is detected as being a special number comprising a numerical value of one:
- the core is further configured to generate a memory address for the second operand;
- the second pipeline is configured to read the second operand from the generated memory address; and
- the core is configured to assign a value of the result as being equal to a value of the second operand.

10. The computation device of claim 6, wherein if the first operand is not a special number:
- the core is further configured to generate a memory address in the memory for the second operand;
- the second pipeline is configured to read the second operand from the generated memory address;
- a processing unit of the core is further configured to perform the computational operation on the first and second operand; and
- the core is configured to store the result of the performed computational operation in the memory for the first and second pipeline.

11. The computational device of claim 6, wherein the memory comprises a plurality of storage cells, the plurality of storage cells further comprising at least one shared memory storage cell comprising data to be broadcasted to the first pipeline and at least one private memory storage cell comprising data to be read to the second pipeline.

12. The computational device of claim 6, wherein the core comprises at least one processing unit array.

13. The computational device of claim 6, wherein the core includes a Single Instruction Multiple Data (SIMD) architecture.

14. The computational device of claim 6, wherein the computational operation is an addition-, subtraction-, multiplication-, or division-based operation.

15. The computational device of claim 6, wherein the core is comprised in a neural network.

16. A non-transient computer readable medium that stores a set of instructions that is executable by a computational device to cause a core of the computational device to:
- run, in parallel, a first and second pipeline of data from the memory of the core, wherein the first pipeline is configured to receive a first operand from the memory and the second pipeline is configured to receive a second operand from the memory, and wherein the first operand and the second operand are input operands for performing a computational operation and the first pipeline operates at least one cycle ahead of the second pipeline;
- generate a memory address in the memory for the first operand;
- read, on the first pipeline, the first operand from the generated memory address;
- detect if the first operand is a special number, wherein a special number is a numerical value which yields a predictable operation result of the computational operation; and
- store, in the memory, a result of the computational operation based on the detection whether the first operation is the special number.

17. The non-transient computer readable medium of claim 16, wherein upon a detection that the first operand is a special number, the set of instructions is configured to cause the core of the computational device further to:
- retrieve the result corresponding to the predictable operation result of the computational operation that is yielded by the detected special number; and
- store the retrieved result in the memory for the first and second pipeline.

18. The non-transient computer readable medium of claim 17, wherein the computational operation is a multiplication operation and wherein the first operand is detected as being a special number comprising a numerical value of zero, the set of instructions is configured to cause the core of the computational device to:
- prevent a generation of a memory address for the second operand.

19. The non-transient computer readable medium of claim 17, wherein the computational operation is a multiplication operation and wherein the first operand is detected as being a special number comprising a numerical value of one, the set of instructions is configured to cause the core of the computational device to:

generate a memory address for the second operand;
read, on the second pipeline, the second operand from the generated memory address; and
assign a value of the result as being equal to a value of the second operand.

20. The non-transient computer readable medium of claim 16,
wherein if the first operand is not a special number, the set of instructions is configured to cause the core of the computational device to:
generate a memory address in the memory for the second operand;
read, on the second pipeline, the second operand from the generated memory address;
perform the computational operation on the first and second operand; and
store the result of the performed operation in the memory for the first and second pipeline.

21. The computation device of claim 6, wherein whether to receive, on the second pipeline, the second operand from the memory for performing the computational operation is determined depending on the detection of whether the first operand is the special number.

* * * * *